United States Patent [19]

Uetake et al.

[11] Patent Number: 5,082,602
[45] Date of Patent: Jan. 21, 1992

[54] PROCESS AND APPARATUS FOR REGENERATING SPENT REPROCESSING EXTRACTION SOLVENT

[75] Inventors: Naohito Uetake; Ietsugu Sekine; Haruo Hasimoto; Tetsuo Fukasawa, all of Hitachi; Hajime Iba, Katsuta, all of Japan

[73] Assignee: Hitachi, Ltd., Tokyo, Japan

[21] Appl. No.: 898,214

[22] Filed: Aug. 20, 1986

[30] Foreign Application Priority Data

Aug. 23, 1985 [JP] Japan .................. 60-184262

[51] Int. Cl.$^5$ .................. G21C 19/42; G21F 9/08; C01G 56/00; C01G 57/00
[52] U.S. Cl. .................. 252/627; 210/500.23; 210/638; 210/649; 210/682; 210/683; 252/364; 252/626; 252/631; 376/313; 423/6; 423/7; 423/70; 423/658.5; 558/150
[58] Field of Search ............... 252/626, 627, 631, 364; 423/DIG 14, 2, 6, 7, 8, 17, 18, 20, 21.5, 24, 54, 70, 658.5; 376/313; 558/150; 210/500.23, 638, 649, 682, 683

[56] References Cited

U.S. PATENT DOCUMENTS

| | | | |
|---|---|---|---|
| 3,154,500 | 10/1964 | Jansen, Jr. et al. | 423/7 |
| 3,173,757 | 3/1965 | Wheelwright et al. | 423/7 |
| 3,252,920 | 5/1966 | Goren | 423/7 |
| 3,708,508 | 1/1973 | Schulz | 252/364 |
| 3,953,568 | 4/1976 | Seko et al. | 423/2 |
| 3,953,569 | 4/1976 | Seko et al. | 423/7 |
| 3,957,504 | 5/1976 | Ho et al. | 423/7 |
| 4,059,671 | 11/1977 | Schmieder et al. | 423/10 |
| 4,159,245 | 6/1979 | Matsushita et al. | 210/500 |
| 4,187,333 | 2/1980 | Rembaum et al. | 423/7 |
| 4,401,591 | 8/1983 | Korostenski | 423/7 |

FOREIGN PATENT DOCUMENTS 1442430 11/1968 Fed. Rep. of Germany.
17-760 1/1942 Japan.

OTHER PUBLICATIONS

Kiani et al., 1984, Solvent Extraction with immobilized interfaces in a microporous hydrophobic membrane, Journal of Membrane Science 20(2): 125-145.

Primary Examiner—Howard J. Locker
Attorney, Agent, or Firm—Antonelli, Terry, Stout & Kraus

[57] ABSTRACT

Cations and anions contained as impurities in a spent organic solvent can be removed by an alkaline aqueous solution passing through inside of hydrophobic porous membrane such as hollow fibers for capturing anions and by an acidic aqueous solution passing through inside of hydrophobic porous membrane such as hollow fibers for capturing cations at the same time so as to regenerate the organic solvent. An apparatus suitable for removing cations and anions simultaneously from the spent organic solvent is also provided.

17 Claims, 5 Drawing Sheets

FIG. l(a)
INNER DIAMETER 250~350μm
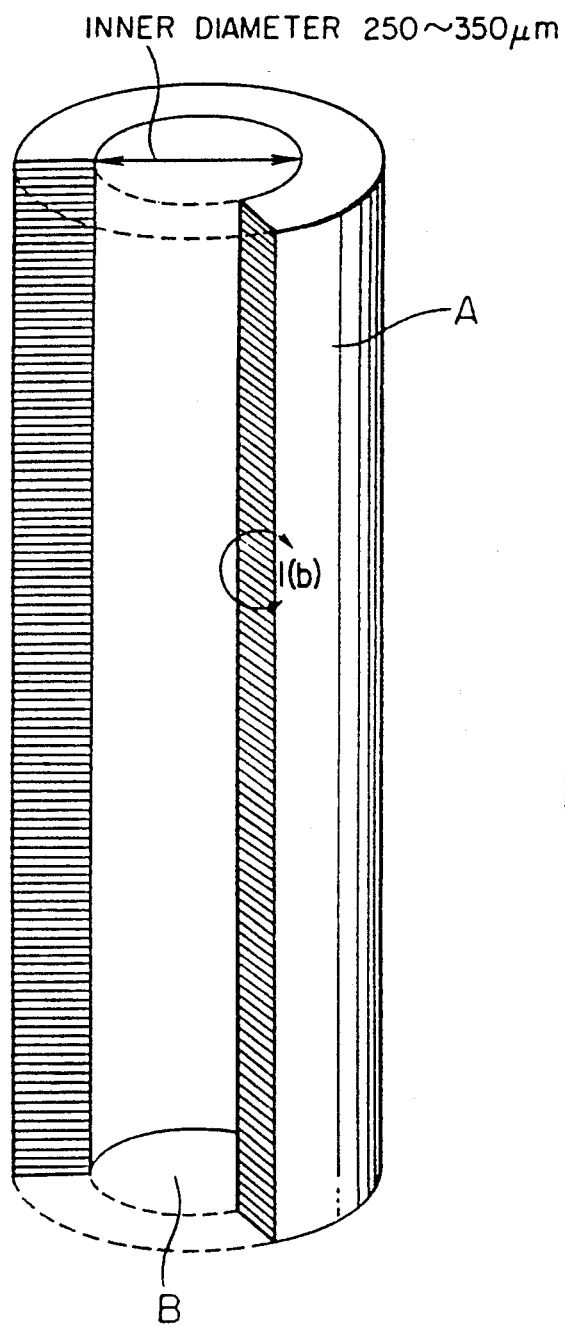
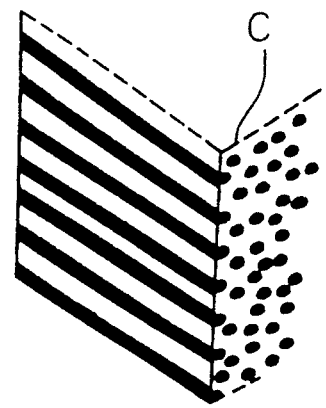
FIG. l(b)

SOLVENT

AQUEOUS PHASE

DETERIORATED SOLVENT

PROCESS AND APPARATUS FOR REGENERATING SPENT REPROCESSING EXTRACTION SOLVENT

BACKGROUND OF THE INVENTION

This invention relates to a process for regenerating a spent extraction solvent containing anions and cations used in e.g. nuclear power plants by separating and removing these ions from the extraction solvent and an apparatus used therefor. This invention is particularly suitable for separating and removing ions contained in an organic solvent for reprocessing in large amounts.

Heretofore, an extraction solvent was regenerated by cleaning the extraction solvent with an alkaline cleaning agent such as sodium carbonate, triethanolamine, etc. by using a liquid-liquid extraction apparatus such as a mixer-settler, etc. (e.g. U.S. Pat. No. 4,059,671). But such a cleaning agent has problems in that it easily precipitates metal ions contained in the deteriorated solvent, the resulting precipitate is collected at an interface of the solvent and the cleaning agent thus interfering with the removal action of captured impurities and making the separation of the solvent and the cleaning agent worse.

SUMMARY OF THE INVENTION

It is an object of this invention to provide a process and an apparatus for regenerating a spent reprocessing extraction solvent without causing interference with cleaning operation accompanied by production of a precipitate in an alkaline circumstance.

This invention provides a process for regenerating a spent organic solvent containing anions and cations by separating and removing these ions from the organic solvent which comprises:

forming one or more alkaline aqueous solution phases for capturing anions via a first hydrophobic porous membrane and forming one or more acidic aqueous solution phases for capturing cations in the organic solvent containing cations via a second hydrophobic porous membrane and anions, capturing the cations by the acidic aqueous solution phases and the anions by the alkaline aqueous solution phases simultaneously through the first and second hydrophobic porous membranes, and collecting the acidic aqueous solution phases for removing the cations therefrom and collecting the alkaline aqueous solution phases for removing the anions therefrom.

This invention also provides an apparatus used for such a process.

BRIEF DESCRIPTION OF THE DRAWINGS

FIG. 1 (a) is a perspective and partially cross-sectional view of a structure of a hollow fiber.

FIG. 1 (b) is an enlarged cross-sectional view of a part of the hollow fiber.

DESCRIPTION OF THE PREFERRED EMBODIMENTS

Figure 2:
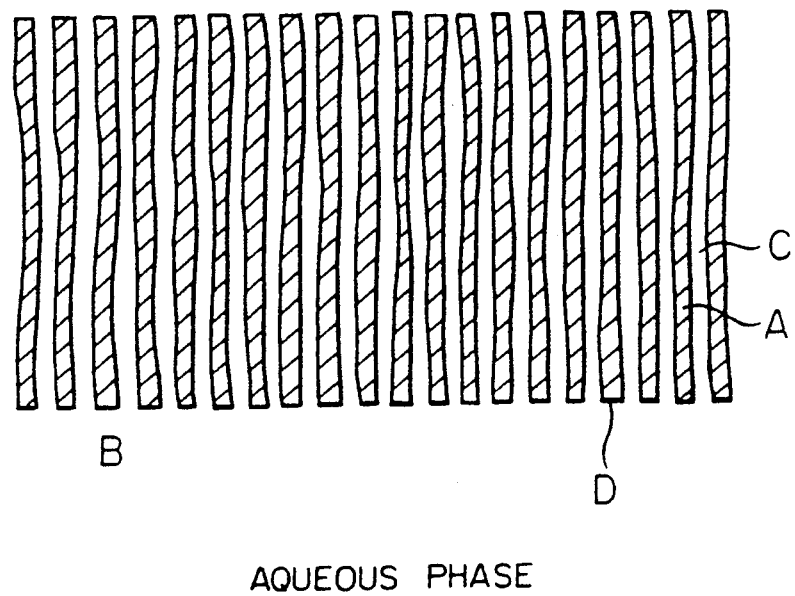
FIG. 2 is an enlarged cross-sectional view of a hollow fiber membrane when a solvent is present outside thereof and an aqueous phase is present inside thereof.

According to this invention, a spent reprocessing extraction solvent can be regenerated without producing a precipitate by selectively removing cationic impurities by an aqueous acidic cleaning agent via a hydrophobic porous membrane and by selectively removing anionic impurities by an alkaline aqueous cleaning agent via a hydrophobic porous membrane at the same time.

As an extraction solvent for fuel-reprocessing in nuclear power plants, tributyl phosphate (hereinafter referred to as "TBP") diluted with n-dodecane is usually used. Both TBP and n-dodecane are decomposed by an influence of radiation or nitric acid to mostly produce acids. Among decomposed products of TBP, the produced amount of dibutyl phosphate (hereinafter referred to as "DBP") is large, which results in giving a great influence on the extraction behavior. Further, metal ions such as zirconium ions, etc. show a tendency to remain in the solvent when DPB is present. Since these metal ions are radioactive, deterioration of the extraction solvent further proceeds.

In the regeneration step of the solvent, it is necessary to remove both anionic impurities such as DBP, etc. and cationic impurities such as zirconium ions, etc. from the solvent. In order to remove DBP, an aqueous sodium carbonate solution is usually used. But since metal ions easily transfer to an aqueous phase in the absence of DBP, they enter into the aqueous sodium carbonate solution. But since the aqueous sodium carbonate solution is strongly alkaline, the metal ions are easily precipitated by forming metal hydroxides.

In order to prevent the precipitation, the solvent (an organic phase) is separated from the aqueous phase via a hydrophobic porous membrane according to this invention. By employing such a process as removing impurities through the membrane, it becomes possible to separate and remove impurities by contacting two or more aqueous phases with the solvent.

In this invention, a hydrophobic porous membrane is used between the solvent containing cationic and anionic impurities (or ions) and aqueous solution phases for removing these ions. The properties of hydrophobic are necessary for only passing ions through micro holes of the membrane. As the hydrophobic porous membrane, there can be used those made from synthetic or natural, organic or inorganic high polymer materials, for example, polyamides, polyacrylonitriles, polyethylenes, polyesters, polypropylenes, polysulfones, polyvinyl alcohols, polyvinyl chloride, glass, etc. Among these membranes, the use of hydrophobic hollow fibers is preferable in order to enlarge the contact area between the spent solvent and two or more aqueous phases and to make the removing efficiency the same as that obtained by the mixer-settler method.

FIG. 1 shows schematically a structure of hollow fiber, wherein A denotes a porous membrane, B a hollow portion, and C pores. Hollow fibers are slightly different in properties dependent on starting materials and production methods but usually have an inner diameter of 250 to 350 $\mu$m and a thickness of 50 to 150 $\mu$m. The porous membrane A has a number of pores C penetrating from the inner side to the outer side as shown in FIG. 1 (b). The open area ratio of 50% or more can easily be obtained. Since the outer diameter of hollow fiber is 1 mm or less, a very large surface area can be obtained by using a bundle of hollow fibers.

Since the pore size of hollow fiber is as small as about 0.05 to 0.5 μm, water passing through the hollow portion of hollow fiber does not leak out to outside of the hollow fiber when the hollow fiber is made from a hydrophobic material. FIG. 2 schematically shows a state of passing an organic solvent phase outside of the membrane A and passing a water phase inside, that is, the hollow portion, of the membrane A. Since the material of the membrane is hydrophobic, the water phase does not enter into pores C. In contrast, the solvent enters into pores to produce interfaces D between the solvent phase and the water phase at the inside (B) of the membrane. Through the interface D, impurities in the solvent can be extracted with the water phase.

When hollow fibers are used, it becomes possible to remove cations and anions contained in the solvent selectively and separately by contacting two or more aqueous phase ion removing agents with the solvent via the porous membranes of hollow fibers.

Figure 3:
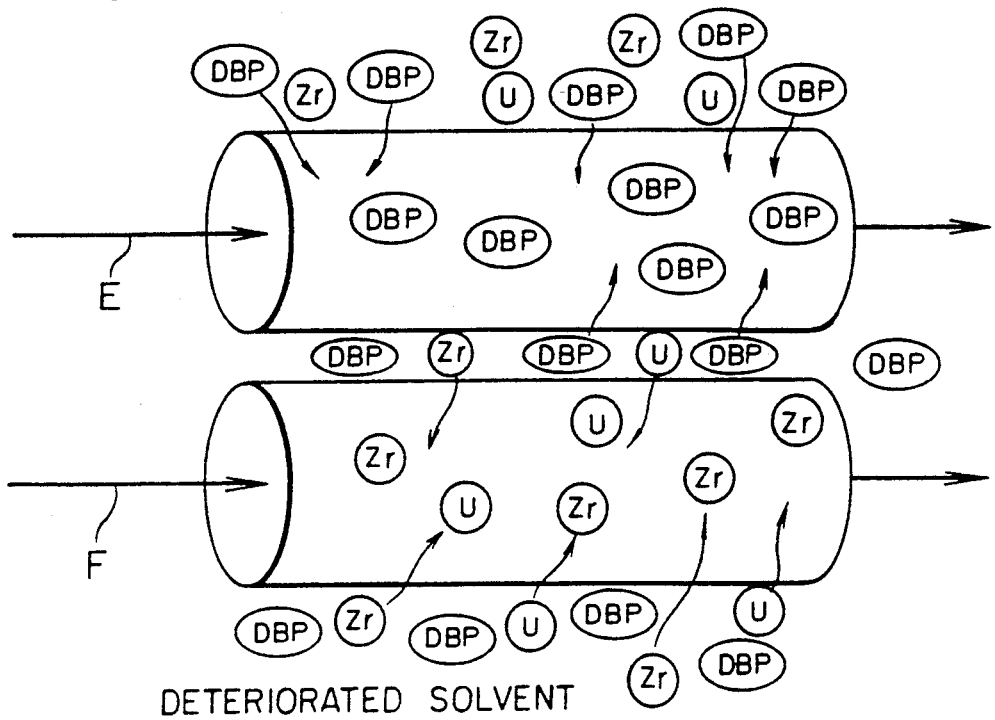
FIG. 3 is a perspective view for explaining the principle of solvent cleaning according to this invention.

FIG. 3 schematically shows a case when two kinds of ion removing agents are used. In one hollow fiber, an anion removing agent E is passed and DBP is mainly removed selectively. In another hollow fiber, a cation removing agent F is passed and metal ions of uranium (U), zirconium (Zr), etc. are mainly removed selectively. Since ions can be selectively removed from a spent (or deteriorated) solvent, this treatment can be conducted depending on properties of ions present in the spent solvent. Unlike the mixer-settler wherein one phase is dispersed in another phase, followed by separation of the two phases by allowing to stand, it is almost not necessary in this invention to consider the specific weights, viscosities, etc., which results in broadening the selection of range of cleaning agents (or ion removing agents). Further, since no moving portion is necessary in the apparatus used in this invention unlike the method of using a mixer, the maintenance of the apparatus is easy and trouble of the apparatus is rare. When a bundle of hollow fibers is immersed in a spent solvent and an alkaline aqueous solution which is an anion removing agent is passed through a part of the hollow fibers and an acidic aqueous solution which is a cation removing agent (or a complexing agent for forming a water-soluble metal complex) is passed through the rest of the hollow fibers, cations and anions in the spent solvent can be removed simultaneously without producing precipitates of metal hydroxides. Further, since no apparatus for standing the dispersed phase is necessary in this invention, there is hardly obtained an influence of insertion of solid substances from the outside.

Figure 4:
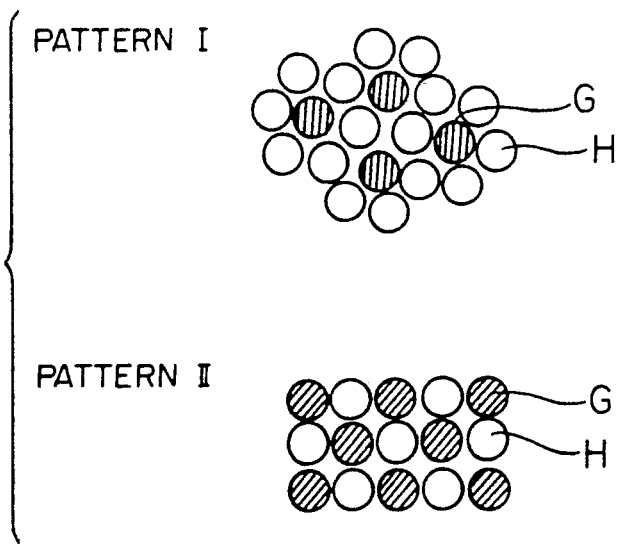
FIG. 4 is cross-sectional views showing typical patterns for arrangement of hollow fibers.

It is preferable to arrange hollow fibers passing the anion removing agent and those passing the cation removing agent as closely as possible. This is because when DBP is removed from the spent solvent, the metal ions easily transfer to the aqueous phase. When the hollow fibers are separated with too far distances, it becomes possible that the metal ions insert into the anion removing agent. If possible, it is preferable to place hollow fibers passing the cation removing agent neighboring to hollow fibers passing the anion removing agent. Examples of such arrangement of hollow fiber modules are shown in FIG. 4, wherein H denotes cation removing hollow fibers and G denotes anion removing hollow fibers. When deterioration of the spent solvent is remarkable, the arrangement of pattern I is preferable, but the removal efficiency of DBP cannot be taken too high. It is possible to use various arrangements of hollow fiber modules passing two kinds of ion removing agents separately in various proportions other than the pattern II shown in FIG. 4. Any arrangement can be employed depending on the state of operation of nuclear power plants.

Since radionuclides are present in the spent solvent, the hollow fibers should have resistance to radiation to some extent. Further, since a small amount of nitric acid is dissolved in the spent solvent, the hollow fibers should have resistance to nitric acid as well as resistance to alkalis considering the use of an aqueous alkaline cleaning agent (anion removing agent). Considering the above-mentioned requirements, hollow fibers made from a synthetic resin such as polystyrene, polyvinyl chloride, polypropylene, polyethylene, polyacrylonitrile, or the like are preferable. Such materials can withstand the dose rate of $10^4$ Gy or more and can be used for one year sufficiently. If necessary, the hollow fibers may be exchanged at every routine inspection.

The hollow fibers can be produced by a conventional process disclosed in, for example, Japanese Patent Examined Publication No. 47-8595.

As the anion removing agent, there can be used an aqueous solution (about 0.1 to 2 N) of alkali metal hydroxides such as NaOH, KOH, etc. In such a case, it is not necessary to consider entrapment of metal ions in the spent solvent. Thus, it is not necessary to add carbonate ions and tartarate ions to the aqueous solution. It is also possible to use an organic alkaline aqueous solution of hydrazine and hydroxylamine as the anion removing agent. Hydrazine and hydroxylamine have a fear of explosion in the presence of nitric acid and are very unstable. But, when they are used by passing through hollow fibers, they can be used safely, since a danger of mixing them in other nitric acid system is very rare. Further, since these anion removing agents can be vaporized completely by pyrolysis, the use of them is excellent from the viewpoint of reducing the amount of solid waste. Further, when the selective separation is carried out by using hollow fibers, since no radioactive metal ions are contained in the resulting anion removing agent, the treatment therefor is easy. It is also possible to use other various organic bases such as ethanolamine, pyridine, aniline, etc. When ethanolamine is used as an anion removing agent, it can be recovered by distillation due to its chemical stability and reused again.

Cations contained in the spent solvent include ions of zirconium, uranium, plutonium usually in 0.1 to 5 moles.

As the cation removing agent, there can be used an acidic aqueous solution of a acid which can form complexes with high stability constants with zirconium, uranium, and the like cations. As the acid, there can be used an inorganic acid such as carbonic acid, etc.; an organic acid such as formic acid, oxalic acid, butyric acid, tartaric acid, etc., alone or as a mixture thereof.

The use of carbonic acid is very effective for uranium cations. It is possible to store uranium with a high concentration in an aqueous phase in the presence of $CO_3^{2-}$ or $HCO_3^-$. The use of an organic acid such as oxalic acid, tartaric acid, etc. is effective for removing zirconium. The use of an organic acid is preferable for reducing the volume of treated waste. When the metallic ions are removed from the cation removing agent after the use by an agglomeration precipitation or ion exchange method, the resulting cation removing agent can be used again.

Figure 5:
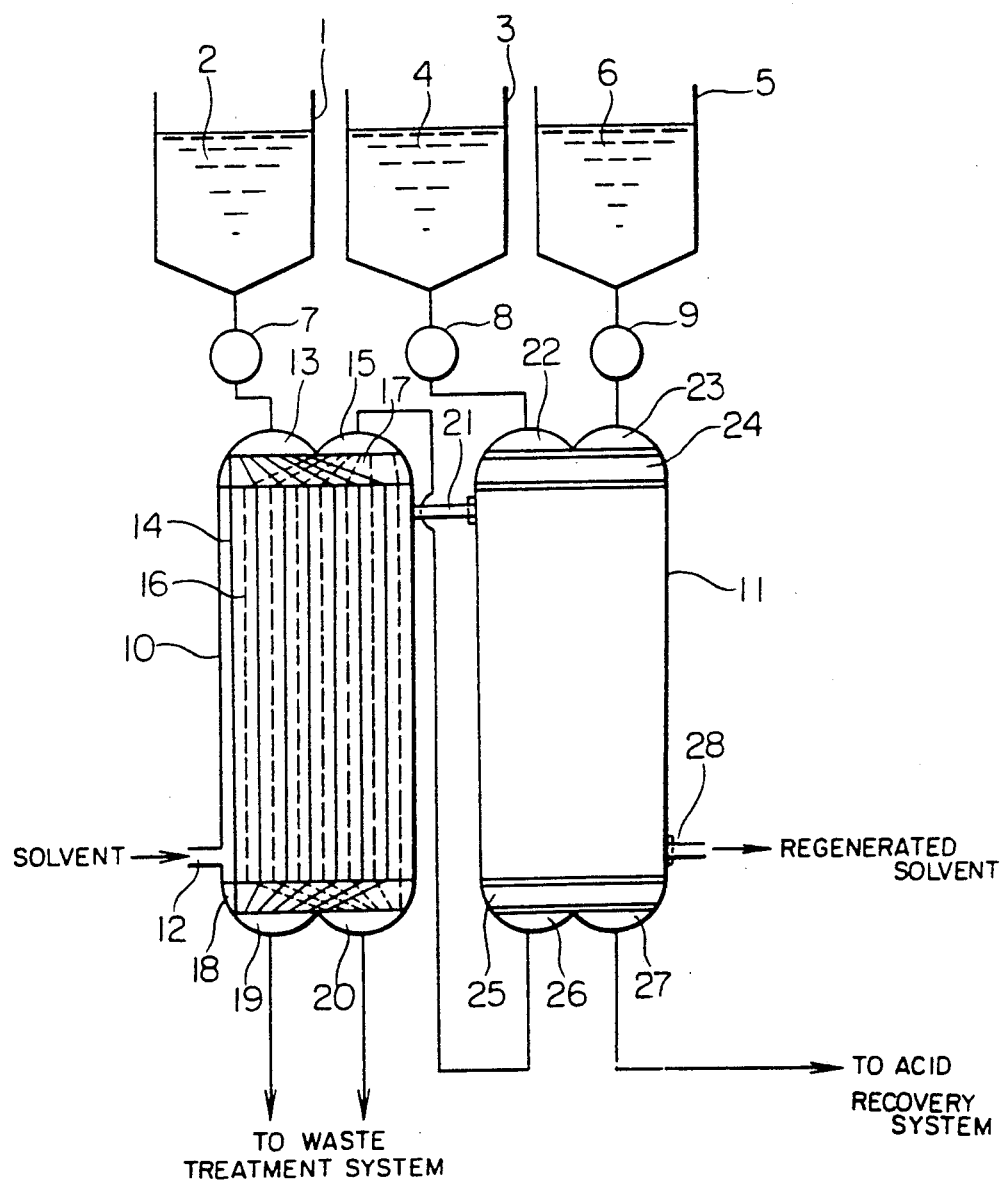
FIGS. 5 and 6 are diagrammatic views of apparatuses used in this invention.

This invention is illustrated further in detail referring to FIG. 5, wherein a spent organic solvent is regenerated by using as ion removing agents an aqueous solution of sodium hydroxide and an aqueous solution of oxalic acid in a first step and an aqueous solution of sodium hydroxide and an aqueous solution of nitric acid in a second step.

In an oxalic acid storing tank 1, 2N-oxalic acid aqueous solution 2 is stored, 1N-NaOH aqueous solution 4 is stored in a sodium hydroxide storing tank 3 and 0.1N-HNO$_3$ aqueous solution 6 is stored in a dilute nitric acid storing tank 5. To individual storing tanks, pumps 7, 8 and 9 are connected, respectively, so as to pass individual aqueous solutions to a solvent regeneration apparatus. The solvent regeneration apparatus comprises a first step ion removing portion 10 and a second step ion removing portion 11. A spent organic solvent comprising 30% by volume of TBP and 70% by volume of n-dodecane containing impurities such as metal ions, DBP, etc. is fed to the first step ion removing portion through a solvent inlet 12. The 2N-oxalic acid aqueous solution 2 is fed to an oxalic acid forcing inlet 13 via the pump 7 and passed to hollow fibers 14 for passing oxalic acid. On the other hand, the sodium hydroxide aqueous solution used in the second step ion removing portion 11 is passed to hollow fibers 16 for passing sodium hydroxide via a sodium hydroxide forcing inlet 15. Both hollow fibers 14 and 16 are rearranged in a hollow fibers initial crossing portion 17 so as to have the pattern I shown in FIG. 4. In the first step ion removing portion 10, the metal ions such as $U^{+2}$, $Zr^{+2}$, etc. in the spent solvent flowed outside of the hollow fibers 14 and 16 are extracted with the oxalic acid solution passing through the hollow fibers 14, and anions such as those of DBP in the spent solvent are extracted with the sodium hydroxide solution passing through the hollow fibers 16. The hollow fibers are rearranged again at a hollow fiber final crossing portion 18 to collect hollow fibers of the same system. The oxalic acid solution is collected at an oxalic acid outlet 19 and the sodium hydroxide solution is collected at a sodium hydroxide outlet 20, respectively. Then, these ion-containing solutions are passed to a waste treating system so as to be treated depending on properties of these wastes.

On the other hand, the spent solvent treated in the first step ion removing portion 10 is passed to the second step ion removing portion 11 via a solvent transporting pipe 21. To the second step ion removing portion 11, the sodium hydroxide aqueous solution is fed from the sodium hydroxide storing tank 3 via the pump 8 and entered into hollow fibers (not shown in the drawing) at a sodium hydroxide forcing inlet 22. Dilute nitric acid is passed to a nitric acid forcing inlet 23 from the dilute nitric acid storing tank 5 via the pump 9 and entered into hollow fibers (not shown in the drawing). The hollow fibers are rearranged at a hollow fiber initial crossing portion 24 so as to have the pattern II shown in FIG. 4. In the second step ion removing portion 11, precise separation of DBP by the sodium hydroxide aqueous solution, and precise separation of metal ions and extraction of the flowed ion removing agent by the dilute nitric acid are conducted by hollow fibers. At a hollow fiber final crossing portion 25, hollow fibers are collected separately depending on the systems and the sodium hydroxide aqueous solution is passed from a sodium hydroxide outlet 26 to the first step ion removing portion 10. The dilute nitric acid is passed to an acid recovering system via a dilute nitric acid outlet 27.

The solvent from which the cations and anions have been removed is taken out of a regenerated solvent outlet 28 to use again as a regenerated solvent. According to this invention, DBP removing ratio is more than 98% and metal ion removing ratio is more than 95%.

According to this example, the spent organic solvent can be regenerated by using an apparatus with a simple structure and with no moving portion. Further there is no fear of lowering the ion removing efficiency due to the formation of precipitates.

Figure 6:
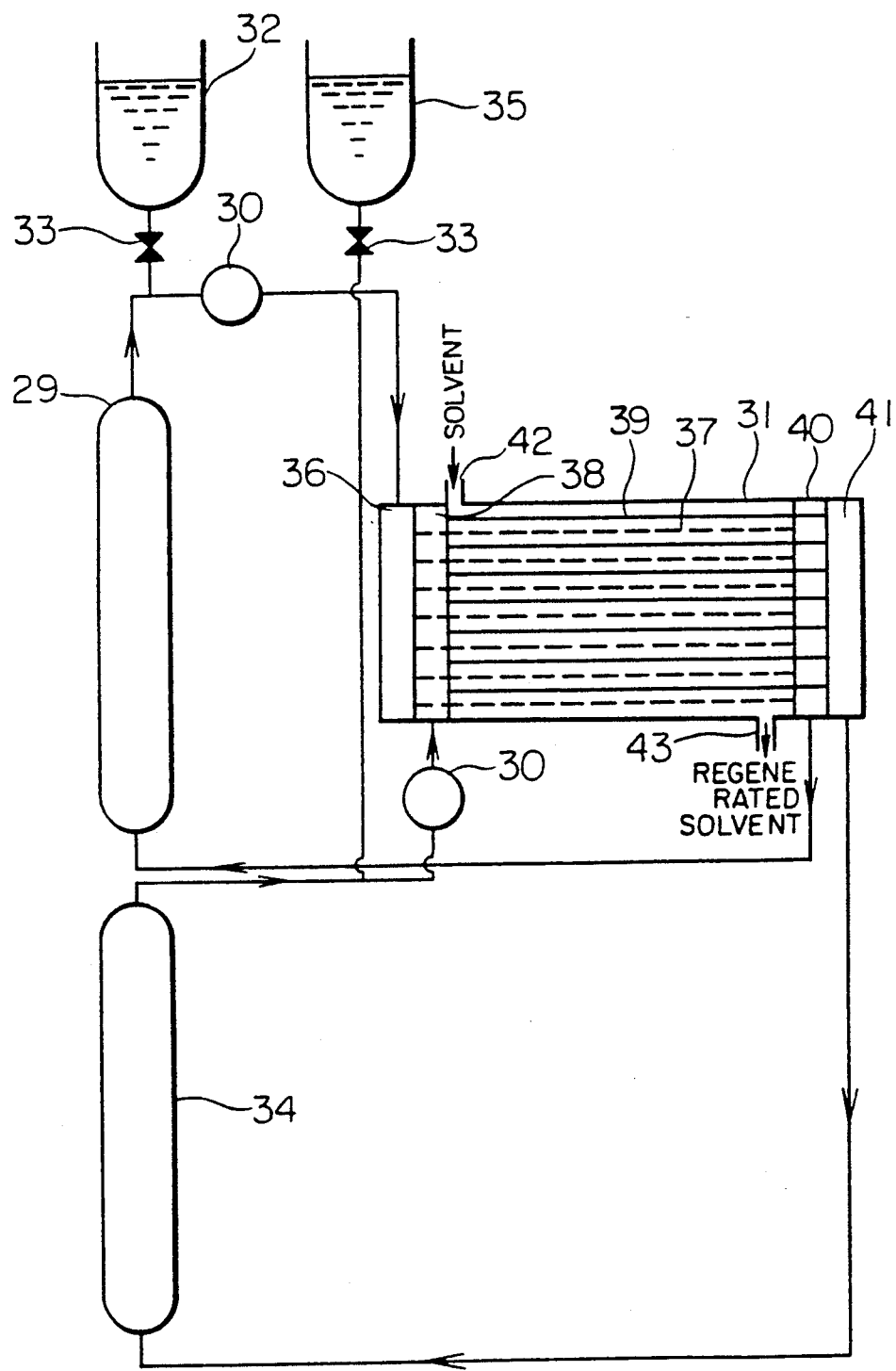

Another example of this invention is explained referring to FIG. 6, wherein the ion removing agents are regenerated and reused so as to reduce the amounts of radioactive wastes produced.

Hydrazine from a hydrazine regenerating device 29 is sent to a solvent regenerating device 31 via a pump 30. When the amount of hydrazine is insufficient due to a loss, hydrazine is supplemented from a hydrazine storing tank 32 by opening a valve 33. A 2N-tartaric acid solution from a tartaric acid solution regenerating device 34 is sent to the solvent regenerating device 31 via a pump 30'. When the amount of tartaric acid is insufficient due to a loss, tartaric acid is supplemented from a tartaric acid storing tank 35 by opening a valve 33'. Hydrazine is fed to a hollow fiber opening portion for hydrazine 36 in the solvent regenerating device 31. In this portion, only inlets of hollow fibers 37 for passing hydrazine are opened and thus hydrazine enters into the hollow fibers 37. On the other hand, the tartaric acid solution is fed to a hollow fiber opening portion for tartaric acid 38. In this portion, only inlets of hollow fibers 39 for passing the tartaric acid solution are opened and thus the tartaric acid solution enters into the hollow fibers 39. A spent organic solvent comprising 30% by volume of TBP and 70% by volume of n-dodecane containing as inpurities DBP and metal ions is passed to the solvent regenerating device 31 from a solvent inlet 42. In the solvent regenerating device 31, the hollow fibers 37 for passing hydrazine and the hollow fibers 39 for passing the tartaric acid solution are packed densely. Anions such as DBP, etc. are extacted with the hydrazine passing through the hollow fibers 37 and the metal ions are extracted with the tartaric acid solution passing through the hollow fibers 39. After such an operation, the solvent is flowed out from a solvent outlet 43 as a regenerated solvent. If necessary, the ion removing operation can be carried out by using one or more the same devices 31 as mentioned above. The hollow fibers passing hydrazine have openings at a hollow fiber opening portion 40 for hydrazine, from which the hydrazine extracting the anions is taken out and sent to the hydrazine regenerating device 29. Hydrazine ($N_2H_4 \cdot H_2O$) vaporizes at 118.5° C. under 740 mm Hg, while DBP cannot vaporize under normal conditions. Therefore, the used hydrazine can be regenerated by distillation and reused repeatedly. On the other hand, the hollow fibers passing the tartaric acid solution have openings at a hollow fiber opening portion 41 for tartaric acid, from which the tartaric acid solution extracting the metal ions is taken out and sent to the tartaric acid solution regenerating device 34. The tartaric acid is regenerated in the device 34 and reused repeatedly. In the tartaric acid regenerating device 34, a cation exchange resin conventionally used is packed and the metal ions are removed by ion exchange. Since the amount of metal ions in the spent solvent is not so large in usual, the cation exchange resin can be used for a long time without exchanging.

According to this example, there can be constructed an apparatus for regenerating a spent organic solvent with a simple structure and a small amount of wastes produced. Further, there is no fear of lowering the ion removing efficiency by producing precipitates.

According to this invention, by using a substance which can selectively extract uranium ions and plutonium ions from a spent solvent dissolving metal ions into an aqueous phase, an ion removing operation can be carried out by passing an anion removing agent aqueous solution, an uranium and plutonium selectively removing agent aqueous solution and a cation removing agent aqueous solution through hollow fibers separately in contact with a spent solvent containing anions such as DBP and metal ions such as uranium ions, plutonium ions, zirconium ions, etc. via the porous membranes of hollow fibers. By this operation, uranium and plutonium which are nuclear fuel substances and other radio nuclides can be recovered separately. Further, by this, a loss of nuclear fuel substances in the reprocessing step and the like can be prevented. In addition, contamination of a waste treating system by plutorium which has a long half-value period can be prevented so as to make the waste treatment simple.

According to this invention, since cations and anions can be separated selectively from a spent organic solvent, inhibition of separation of captured ions by precipitation of metal hydroxides under alkaline circumstances according to the prior art can be prevented.

What is claimed is:

1. A process for regenerating a spent organic solvent containing anions and cations by separating and removing the anions and cations from the organic solvent, the process comprising:

forming one or more alkaline aqueous solution phases for capturing anions via a first hydrophobic porous membrane and forming one or more acidic aqueous solution phases for capturing cations via a second hydrophobic porous membrane in the organic solvent containing cations and anions;

capturing the cations by the acidic aqueous solution phases and the anions by the alkaline aqueous solution phases simultaneously through the first and second hydrophobic porous membranes; and collecting the acidic aqueous solution phases for removing the cations and collecting the alkaline aqueous solution phases for removing the anions.

2. A process according to claim 1, wherein the first and second hydrophobic porous membranes are made from a synthetic resin.

3. A process according to claim 2, wherein the first and second hydrophobic porous membranes are hollow fibers made from a synthetic resin.

4. A process according to claim 1, wherein the alkaline aqueous solution is passed through a first part of a bundle of hollow fibers made from a synthetic resin and the acidic aqueous solution is passed through a remainder of the bundle of hollow fibers and the bundle of hollow fibers is placed in a stream of the spent organic solvent.

5. A process according to claim 4, wherein the alkaline aqueous solution is an aqueous solution of sodium hydroxide, potassium hydroxide, hydrazine, hydroxylamine, ethanolamine or a mixture thereof, and the acidic aqueous solution is an aqueous solution of carbonic acid, formic acid, oxalic acid, butyric acid, tartaric acid or a mixture thereof.

6. A process according to claim 4, wherein the bundle of hollow fibers are constructed so as to place a string of hollow fiber passing the alkaline aqueous solution therethrough neighboring to at least one string of hollow fiber passing the acidic aqueous solution therethrough.

7. A process according to claim 1, wherein said first and second hydrophobic porous membranes are arranged in a regeneration column so as to be in close proximity to each other, a stream of the spent organic solvent is introduced into the column and the stream is caused to contact said first and second hydrophobic membranes simultaneously.

8. A process according to claim 1, further comprising regenerating the collected acidic aqueous solution phases for removing the cations and regenerating the collected alkaline aqueous solution phases for removing the anions.

9. A process according to claim 8, wherein the regeneration of the acidic aqueous solution phases for removing the cations takes place by ion exchange.

10. A process according to claim 8, wherein the regeneration of the alkaline aqueous solution phases for removing the anions takes place by distillation.

11. A process according to claim 1, wherein more than 98% of dibutyl phosphate which is present in the spent organic solvent is removed.

12. A process according to claim 1, wherein more than 95% of metal ions which are present in the spent organic solvent are removed.

13. A process according to claim 1, wherein capturing the cations by the acidic aqueous solution phases and the anions by the alkaline aqueous solution phases simultaneously includes:

providing the first and second hydrophobic porous membranes in a regenerating device;

passing the alkaline aqueous solution phases through the first hydrophobic porous membrane;

passing the acidic aqueous solution phases through the second hydrophobic porous membrane;

passing the spent organic solvent through the regenerating device so as to flow outside the first and second hydrophobic porous membranes;

and further wherein the steps of passing the alkaline aqueous solution phases, the acidic aqueous solution phases and the spent organic solvent take place simultaneously.

14. A process according to claim 13, wherein the first hydrophobic membrane is made up of a first plurality of hollow fibers and the second hydrophobic membrane is made up of a second plurality of hollow fibers.

15. A process according to claim 14, wherein the first and second pluralities of hollow fibers are arranged in a bundle such that individual hollow fibers of the first plurality of hollow fibers are dispersed in the second plurality of hollow fibers.

16. A process according to claim 14, wherein the first and second pluralities of hollow fibers are arranged in a bundle such that individual hollow fibers of the first plurality of hollow fibers are alternatively disposed in relation to individual hollow fibers of the second plurality of hollow fibers.

17. A process according to claim 13, wherein said first and second hydrophobic porous membranes are arranged in a regeneration column so as to be in close proximity to each other, a stream of the spent organic solvent is introduced into the column and the stream is caused to contact said first and second hydrophobic membranes simultaneously.

* * * * *